J. K. MEANS.
DENTAL APPLIANCE.
APPLICATION FILED AUG. 26, 1920.

1,367,885. Patented Feb. 8, 1921.

Inventor
J. K. Means
By F. R. Cornwall Atty

UNITED STATES PATENT OFFICE.

JOSEPH K. MEANS, OF DECATUR, ILLINOIS.

DENTAL APPLIANCE.

1,367,885.  Specification of Letters Patent.  Patented Feb. 8, 1921.

Application filed August 26, 1920. Serial No. 406,150.

*To all whom it may concern:*

Be it known that I, JOSEPH K. MEANS, a citizen of the United States, residing at city of Decatur, county of Macon, in the State of Illinois, have invented a certain new and useful Improvement in Dental Appliances, of which the following is a full, clear, and exact description, such as will enable others skilled in the art to which it appertains to make and use the same, reference being had to the accompanying drawings, forming part of this specification, in which—

This invention relates to a new and useful improvement in dental appliances, the object being to provide an anchorage for artificial teeth which anchorage may be adjustably mounted and secured to a natural tooth so as to provide a mount for the artificial tooth.

Another object of my invention is to simplify its application, rendering it adaptable to various mountings.

Figure 1:
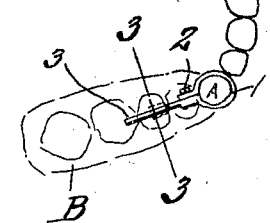
Figure 1 is a plan view of one form of my dental appliance in position.
Figure 2:
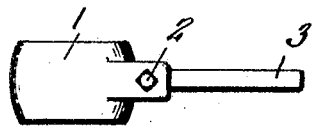
Fig. 2 is an enlarged side elevational view.
Figure 3:
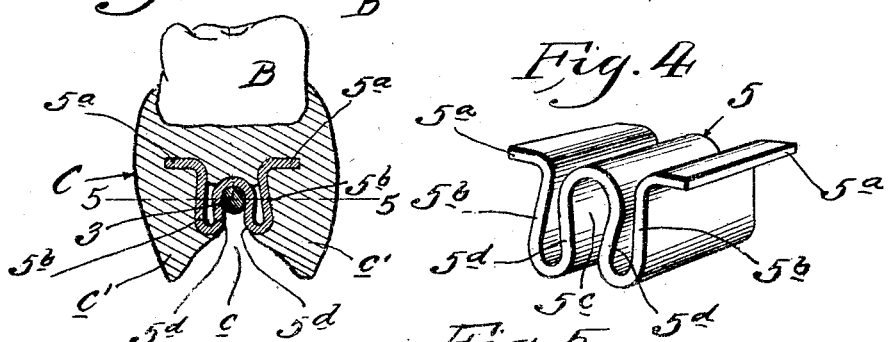
Fig. 3 is a sectional view on line 3—3 of Fig. 1.

In the drawings, 1 indicates a band slightly concave or convex in cross section. The ends of this band, when applied to the natural tooth are pressed toward each other and outwardly by suitable means. One end of said band has an aperture, and passing through this aperture and engaging the threaded opening of the opposite end is a binding screw 2. The threaded end of band 1 is increased in thickness or reinforced by bar 3 projecting longitudinally from said end. Bar 3 can be formed integral with said band, or soldered or otherwise secured to it. This bar 3 increases the depth of the threaded opening to provide ample material for the engagement of screw 2, and serves as the anchorage for the mounting of the artificial teeth. By this construction, when the screw 2 is turned home, the ends of the band are drawn together around the natural tooth indicated at A, Fig. 1, and in the final mounting, after the band has been adjusted to fit the tooth properly, cement is preferably arranged around the tooth and the band drawn tightly over the cement to form a solid anchorage for the bar 3. This anchorage avoids the necessity for grinding the natural tooth A, and by the concavo-convex walls of the band, the barrel-shaped body or contour of the natural tooth can be neatly fitted so that in the final application, with the underlying layer of cement, the band may be rigidly mounted on the natural tooth, thereby providing a permanent anchorage, but one which is capable of removal by unscrewing the screw 2 and spreading the ends of the band, should occasion require.

Figure 4:
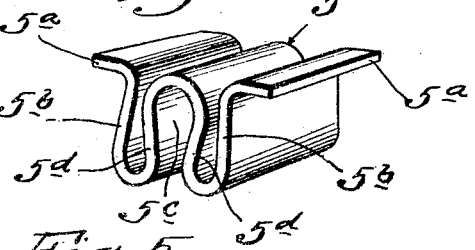
Fig. 4 is a detail view of the clip shown in Fig. 3.
Figure 5:
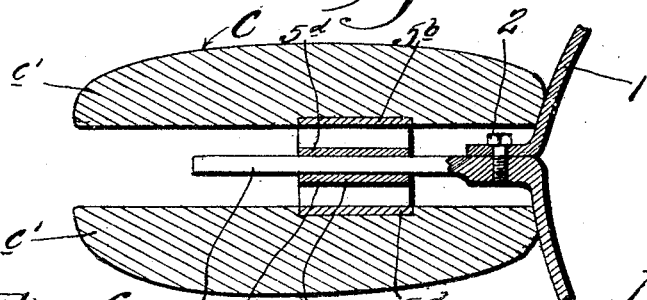
Fig. 5 is a horizontal sectional view.
Figure 6:
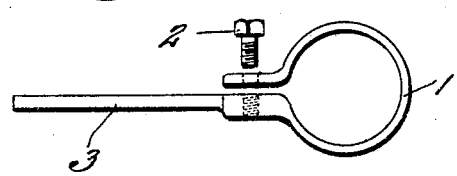
Fig. 6 is a plan view of my invention.

When the anchored bar or support is mounted in position, a wax impression may be made and the artificial teeth B, arranged therein, said teeth of course being properly articulated with the natural teeth to provide the correct "bite." As part of the operation of thus positioning the artificial teeth by embedding them in a mass of wax, indicated at C, I arrange a clip 5 on the anchoring bar and locate it in proper position on said bar, using one or more clips as occasion requires. This clip is shown in detail in Fig. 4 and consists of metal, (preferably gold, in fact all of the metallic parts are preferably made of gold of proper carat) substantially W-shaped having its marginal edges $5^a$ bent outwardly to form embedding flanges on each side which are practically entirely surrounded by the wax in the first instance. The outer legs $5^b$ of this W-shaped strip are preferably convergent, being folded at their lower or widened portion so as to form an opening $5^c$ by means of the legs $5^d$, which legs are slightly contracted at their lower ends so that they will provide a narrow mouth for the introduction of the anchoring bar into the opening $5^c$.

It will be observed, with relation to this clip, that the legs $5^d$ are entirely free and by the insertion of the spreading instrument between the lower portions thereof, the mouth to the opening $5^c$ may be made larger or widened to accommodate different sizes of anchoring bars; or, by introducing a pointed instrument between the lower portions of the legs $5^b$ and $5^d$, this mouth may be made smaller or narrower. This centrally arranged saddle portion of the clip is practically free and the surfaces of its walls which engage the anchoring bar may be brought together more closely or spread apart a greater distance depending upon the size of the bar and the necessities of each case.

In order to give access to the spaces between the walls $5^b$ and $5^d$, I preferably cut away the wax as at $c$, thus providing a groove in the bottom of the wax to receive the anchoring bar, which groove has one or more clips 5 spanning the same at selected points.

After the wax has been properly shaped, the requisite number of clips 5 arranged therein, and the artificial teeth B positioned in the upper portion of the body of wax, the process of forming a mold and casting the permanent mass of material, such as vulcanite or other rubber composition in the molded cavity or matrix formed by the wax, which is molded therefrom, may be practiced in a manner well known to those skilled in the art and need not be described in detail here.

The artificial teeth mounted in the rubber composition having a groove in its bottom and one or more clips whose saddle walls are free and adjustable, are then placed in position on the anchoring bar and may be taken out and replaced at will. To hold the artificial mounting on the teeth in vertical position, the curtain extensions $c'$, preferably extend down on each side of the gum-ridge and proper formation can be given the mounting at the point of connection of the anchoring bar to the natural tooth upon which it is mounted to prevent longitudinal movement.

Figure 7:
Fig. 7 is a plan view of another form of my invention.

In Fig. 7 I have shown another form of anchorage bar in which the threaded rod 6 forms an extension upon the flap of the band 7, the other lap of said band having a perforated lug 8 through which said bar passes, there being a nut 9 which is designed to be threaded on the bar for impingement against the lug 8 which permits of an adjustment of the band either in the way of enlarging its diameter in fitting it to a tooth, or subsequently shrinking its diameter to cause the band to tightly clamp the natural tooth.

These various methods of mounting the anchoring bar of a natural tooth may be changed according to the choice of the operator as occasion requires the use of a short or long bar. In any case, the clip 5 may be used in connection with the mounting for the artificial teeth to enable the artificial teeth to be quickly placed in or removed from position. I deem the free walls of the saddle portion of the clip as an important feature of my invention, as by this means I am enabled to use the same size clip for different sizes of bars, within, of course, certain ranges, and further in the event that the contracted mouth portion of the clip becomes sprung or enlarged from frequent use, the free side walls thereof may be readily adjusted inwardly to restore the same to their intended clipping position in which the mounting for the artificial teeth may not be accidentally displaced or removed from position.

If desired, the screw 2 and the end of the anchor band 1 or lug 8 and nut 9 could be utilized as shoulders to prevent longitudinal movement of the artificial teeth along the anchoring bar.

What I claim is:

1. The combination with an anchorage for artificial teeth comprising a band for embracing a natural tooth, an anchoring bar extending from said band, and means for adjusting the diameter of the band, of a removable denture adapted to inclose said anchoring bar and said adjusting means.

2. In an anchorage for artificial teeth the combination with an adjustable band designed to be mounted upon a natural tooth, an anchoring bar secured to said band, of a resilient clip carried by the removable denture and adapted to engage said anchoring bar.

3. A dental appliance comprising an anchoring bar having a shoulder or projection and a resilient clip carried by the artificial denture coöperating with said bar and its projection.

4. In a dental appliance, means for mounting artificial teeth comprising an anchoring bar secured to a natural tooth, and a clip carried by the artificial denture which is designed to be superimposed upon the gum, said clip having its marginal edges embedded in said artificial denture, and having free walls which may be moved toward and from each other to receive the anchoring bar.

5. In a dental appliance, the combination with an anchoring bar secured to a natural tooth, of a clip which is substantially W-shaped, and provided with anchoring means arranged to be embedded in an artificial denture, said clip being made of resilient metal.

6. In a dental appliance, the combination with an artificial denture, of a clip having anchoring flanges arranged to be embedded in said artificial denture, said clip also having a saddle portion, the walls of which latter are free to be moved toward and from each other when the clip is in its embedded position.

7. In a dental appliance, a clip comprising outwardly extending flanges designed to be embedded in an artificial denture, there being a centrally arranged saddle portion in the clip for receiving an anchoring bar, the mouth of which saddle portion is constricted.

8. The combination with an artificial denture having a groove in its bottom of one or more clips provided with free walls spanning said groove.

9. The combination with an artificial denture having a groove in its bottom, of a clip spanning said groove and having its marginal edges embedded in said artificial denture, said clip having free walls which may be adjusted toward and from each other when the clip is in position.

In testimony whereof I hereunto affix my signature this 3d day of August, 1920.

JOSEPH K. MEANS.